Nov. 19, 1935.  C. S. BRYKCZYNSKI ET AL  2,021,251
CONVEYER APPARATUS FOR DOUGH WORKING MACHINERY
Filed Dec. 11, 1933  2 Sheets-Sheet 1
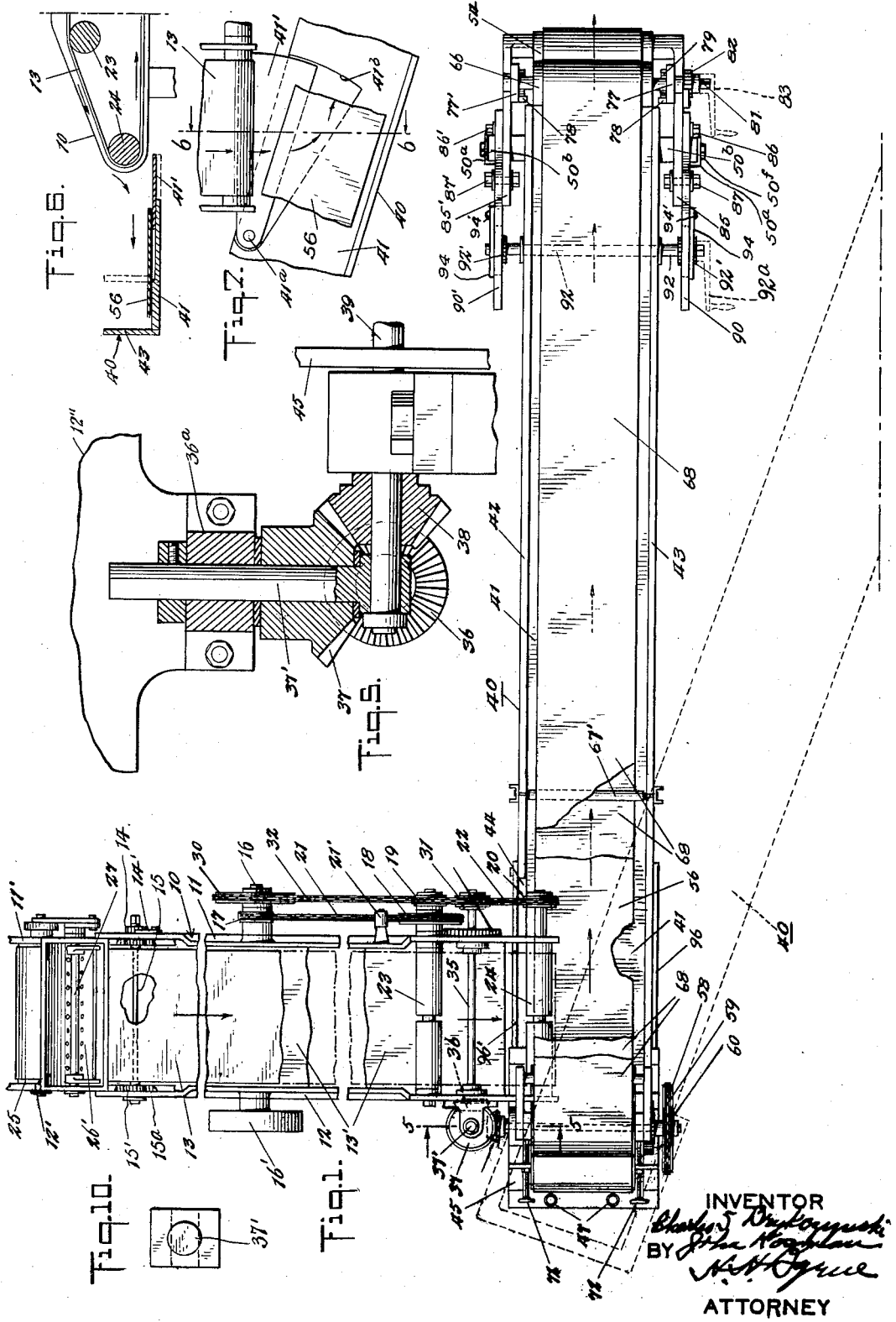

Nov. 19, 1935.   C. S. BRYKCZYNSKI ET AL   2,021,251
CONVEYER APPARATUS FOR DOUGH WORKING MACHINERY
Filed Dec. 11, 1933   2 Sheets-Sheet 2
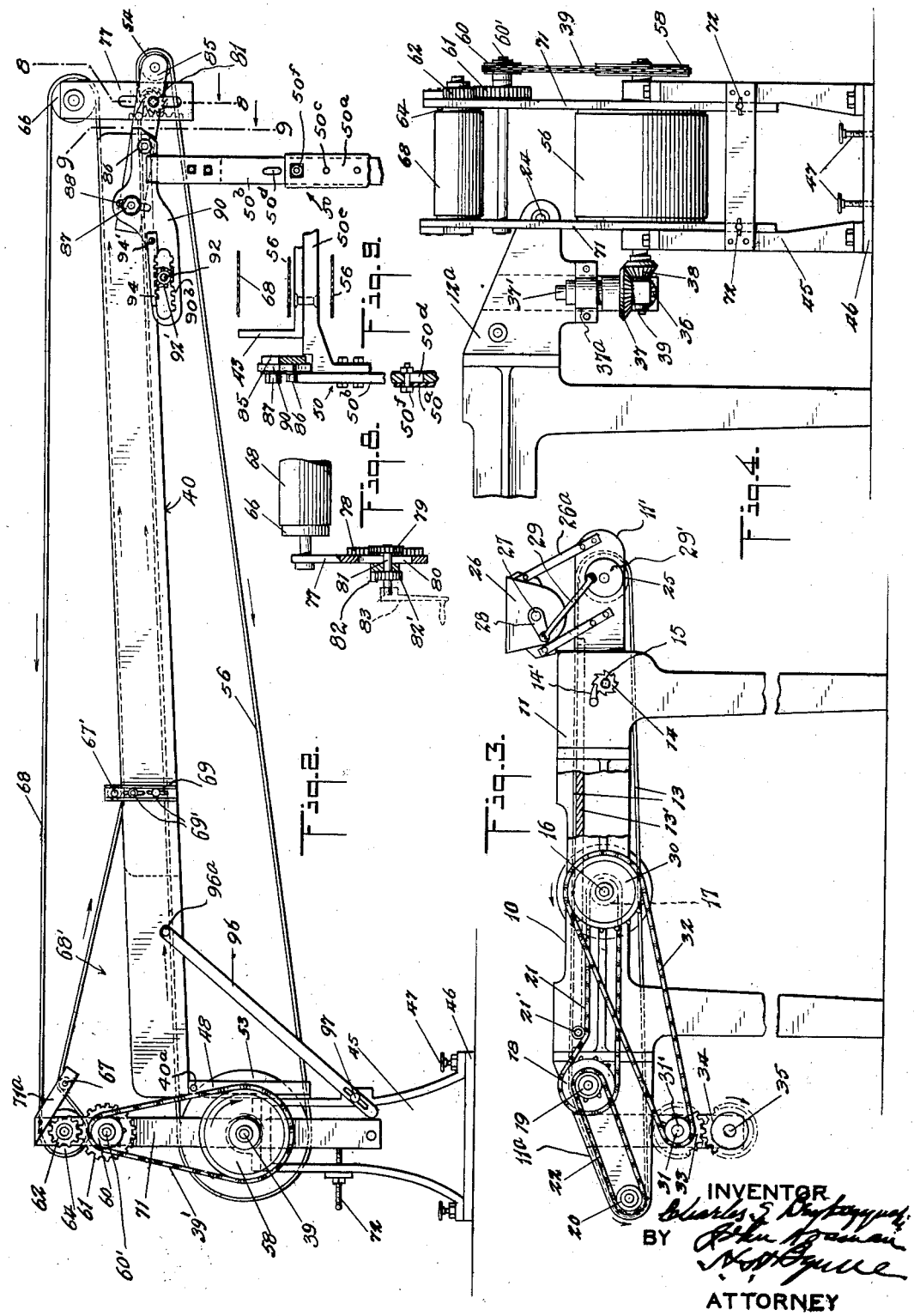

Patented Nov. 19, 1935

2,021,251

UNITED STATES PATENT OFFICE 2,021,251

CONVEYER APPARATUS FOR DOUGH-WORKING MACHINERY

Charles S. Brykczynski and John Kosman, Brooklyn, N. Y., assignors to Geo. F. Stuhmer & Company, New York, N. Y., a corporation of New York Application December 11, 1933, Serial No. 701,936

15 Claims. (Cl. 107—7)

This invention relates to dough working machinery, and more particularly to an apparatus for conveying lumps or pieces of dough from a dough divider to a dough rounder, dough molder, dough proofer or the like machine.

The invention has for one of its objects to provide an apparatus of the character stated which will enable the lumps of dough discharged from a dough divider to be received in materially less space than has heretofore been found possible, and which will combine the function of the receiving belt of a dough divider with that of its separating belt.

The invention has for a further object to provide and apparatus of the character stated through the medium of which the lumps of dough discharged from any one of a plurality of dough dividers may be delivered to any one of a plurality of dough rounders, dough molders or dough proofers, whereby the equipment of a bakery may have greater flexibility than has heretofore been obtainable, and whereby to prevent those losses heretofore sustained as the result of the breaking down of a dough divider or a dough rounder or the like.

The invention has for a further object to provide an apparatus of the character stated which will comprise a conveyer arranged to receive the lumps of dough from a dough divider, and a conveyer angularly related to said first or receiving conveyer and adapted to carry the lumps of dough from the receiving conveyer to a dough rounder or the like, and adapted while carrying the lumps of dough to so space them relatively as to feed them individually to the rounder or the like.

The invention has for a further object to provide an apparatus of the character stated wherein the carrying and separating conveyer will be adjustable about a vertical axis, whereby its angular position with relation to the receiving conveyer may be so altered as to adapt it to deliver the lumps of dough to any one of a plurality of dough rounders, dough molders, dough proofers or the like.

The invention has for a further object to provide an apparatus of the character stated wherein the carrying and separating conveyer will be adjustable about a horizontal axis into such upwardly and forwardly inclined position as to adapt it to deliver the lumps of dough to an overhead dough proofer, to a dough rounder, to a dough molder or to a second dough rounder or proofer having their entrances arranged, as, for example, at 90°, 60°, 45° and 30°, respectively, with relation to the vertical.

The invention has for a further object to provide an apparatus of the character stated wherein the carrying and separating conveyer will, in any inclined position, positively convey the lumps of dough to the dough rounder or the like, and wherein this conveyer will be adjustable to adapt it to carry and separate lumps of dough of different sizes for individual delivery to a dough rounder or the like.

The invention has for a further object to provide an apparatus of the character stated which will embody means adapted to effect the operation of the receiving conveyer and the carrying and separating conveyer from a single prime mover, and wherein said means will embody the vertical and horizontal axes about which the carrying and separating conveyer is adjustable.

With the foregoing and other objects in view, the nature of which will appear as the description proceeds, the invention consists in construction, combination and arrangement of parts hereinafter fully described and claimed, and illustrated in the accompanying drawings, wherein:

Figure 1 is a top plan view of the apparatus;

Figure 2 is a view in side elevation of the carrying and separating conveyer;

Figure 3 is a view partly in side elevation and partly in vertical section of the receiving conveyer;

Figure 4 is a view of fragmentary portions of the conveyers and of that portion of the operating means embodying the axes about which the carrying and separating conveyer is adjustable;

Figure 5 is a sectional view on an enlarged scale taken on the line 5—5 of Figure 1;

Figure 6 is a sectional view illustrating the manner in which the lumps of dough are discharged from the receiving conveyer onto the carrying and separating conveyer, the section being taken on the line 6—6 of Figure 7;

Figure 7 is a top plan view of fragmentary portions of the discharge end of the receiving conveyer and the receiving end of the carrying and separating conveyer;

Figure 8 is a sectional view taken on the line 8—8 of Figure 2;

Figure 9 is a sectional view taken on the line 9—9 of Figure 2, and

Figure 10 is a top plan view of the shaft constituting the axis about which the carrying and separating conveyer is adjustable horizontally.

Referring in detail to the drawings, and particularly to Figures 1 and 3, 10 designates a conveyer which in practice will be arranged to receive the lumps of dough discharged from one or more dough dividing machines. The conveyer 10 will be arranged parallel to the dough dividers, and not angularly with relation thereto as is now the practice, in order to reduce to a minimum the space required to receive the lumps of dough from the dividers.

The conveyer 10 comprises side frames 11 and 12 provided with rear extensions 11' and 12' and front extensions 11a and 12a. An endless belt 13 arranged between the frames is supported by rollers 23, 24 and 25. The roller 23 is journaled in the extensions 11a and 12a, and the shaft 23a thereof has fixed thereto sprocket wheels 18 and 19. The roller 24 is journaled in the extensions 11a and 12a forwardly of and below the roller 23. A sprocket wheel 20 is fixed to the shaft 24a of the roller 24, and this sprocket wheel and the sprocket wheel 19 are connected by a sprocket chain 22. The roller 25 is journaled in the extensions 11' and 12' with its upper side in horizontal alinement with the corresponding side of the roller 23 and a plate 13' supported by the frames between these rollers. The rollers 23—25 and the plate 13' support the belt 13 with the major or rear portion of its upper run horizontally disposed and with the minor or front portion of this run extending downwardly and forwardly from the major portion.

The extensions 11' and 12' are adjustable rearwardly with relation to the frames 11 and 12 to take up any slack occurring in the belt 13. A shaft 15 journaled in the frames 11 and 12 and extending through slots in the extensions 11' and 12', and pinions 15' fixed to the shaft and engaging rack teeth 15a formed in the bottom walls of the slots constitute means by which the extensions may be adjusted. The shaft 15 may be turned by a hand crank, not shown, to effect the adjustment of the extensions 11' and 12'. To maintain the belt 13 under adjusted tension, the shaft 15 is held against retrograde movement by means comprising, as clearly shown in Figure 3, a ratchet wheel 14 fixed to the shaft, and a pawl 14' pivoted to the frame 11 and engaging the ratchet wheel.

A drive shaft 16 is journaled in the frames 11 and 12 below the plate 13', and secured to the shaft is a pulley 16' which in practice will be belted to an electric motor or other prime mover. The roller 23 is driven from the shaft 16 through a sprocket wheel 17 fixed to the shaft, and a sprocket chain 21 engaged with this sprocket wheel and the sprocket wheel 18 fixed to this roller. The roller 24 is driven from the roller 23 through the medium of the sprocket wheels 19 and 20 and the sprocket chain 22. A tensioning roller 21' mounted on the frame 11 contacts with the upper run of the sprocket chain 21.

To prevent the lumps of dough from adhering to the belt 13, the upper run of the belt is coated with flour by means comprising a hopper 26 supported above the rear end of the upper run of the belt 13 by bracket arms 26a secured to the extensions 11' and 12'. A shaft 27 journaled in the hopper 26 carries an agitator 26' which operates to cause the flour to discharge through openings in the bottom of the hopper onto the belt 13. The agitator 26' is operated from the roller 25 through a crank 28 secured to the shaft 27, and a link 29 connected to the crank and to a wrist pin carried by a disc 29' fixed to the roller.

The carrying and separating conveyer is angularly related to the receiving conveyer 10, and extends from the discharge end of the receiving conveyer to a dough rounder, dough molder, dough proofer or the like, not shown. This conveyer comprises a trough 40 and endless lower and upper belts 56 and 68, respectively. The trough 40 is pivotally mounted at its rear end, as at 40a, upon bracket arms 48 extending upwardly from the front side of a standard 45, and it is mounted at its front end upon adjustable props 50. The bracket arms 48 and props 50 support the trough 40 for adjustment into any upwardly and forwardly inclined position necessary to adapt the carrying and separating conveyer to deliver the lumps of dough to an overhead dough proofer, to a dough rounder, to a dough molder or to a second dough rounder or proofer having their entrances arranged, as, for example, at 90°, 60°, 45° and 30°, respectively, with relation to the vertical. Bars 96 and 96' pivoted, as at 96a, to the trough 40, and connected adjustably, as at 97, to the standard 45, brace the trough at the rear or receiving end thereof.

A roller 53 fixed to a shaft 39 journaled on the standard 45, and a roller 54 journaled in arms 85 and 85' extending beyond the front end of the trough 40, support the belt 56. The upper run of the belt 56 moves over and is supported by the bottom 41 of the trough 40. The sides 42 and 43 of the trough 40 extend above the upper run of the belt 56 to prevent the lumps of dough from being laterally displaced from the belt. The roller 53, which is larger than the roller 54, serves as the driving roller for the belt 56. Rack bars 90 and 90' mounted on the props 50 for forward adjustment with relation to the front end of the trough 40, carry the arms 85 and 85', and are pivotally connected at their front ends, as at 86 and 86', to the arms at points between the ends of the latter. The arms 85 and 85' and the rack bars 90 and 90' are held against accidental pivotal movements with relation to each other by bolts 87 and 87' carried by the arms and passing through slots 88 in the rack bars. The rack bars 90 and 90' are forwardly adjustable with relation to the trough 40, to the end that any slack occurring in the belt 56 may be taken up. A shaft 92 journaled on the bottom of the trough 40 and provided with a hand crank 92a, and pinions 92' fixed to the shaft and engaging the teeth 90b of the rack bars 90 and 90', provide means by which the rack bars may be adjusted. Latches 94 pivoted, as at 94', to the rack bars 90 and 90' engage the pinions 92' to hold the rack bars in adjusted position.

A roller 64 is journaled in the upper ends of levers 71 and 71' which are pivoted between their ends to the shaft 39 at opposite sides of the driving roller 53 for the belt 56. A roller 66 is journaled in the upper ends of bearing brackets 77 and 77' extending upwardly from the arms 85 and 85' and mounted thereon for vertical adjustment with relation thereto. The rollers 64 and 66 carry the upper belt 68, and the roller 64, which is mounted directly above the drive roller 53 for the belt 56, serves as a drive roller for this belt. The rollers 64 and 66 are located above the bottom of the trough 40, and the roller 64 is located at a point higher than the roller 66. Guide rollers 67 and 67' support the rear or minor portion of the lower run of the belt 68 in a downwardly and forwardly inclined position with relation to the corresponding portion of the upper run of the belt 56. These belt portions provide an entrance opening between the belts, into which opening the lumps of dough are discharged from the receiving conveyer. The roller 67 is mounted in bearing brackets 71ª fixed to the levers 71 and 71'. The roller 67' is mounted in bearing brackets 69 mounted on the sides of the trough 40, as at 69', for vertical adjustment with relation to the trough. The rollers 66 and 67' maintain the front or major portion of the lower run of the belt 68 in spaced parallel relation to the corresponding portion of the upper run of the belt 56, and the adjustability of the carrying members 67, 77 and 77' for these rollers enables the spaced relation of these portions of the belts to be varied so as to adapt the conveyer to carry and properly space lumps of dough of different sizes.

Means for adjusting the bearing brackets 77 and 77' comprises a shaft 81 journaled in the arms 85—85' and passing through slots 80 in the bearing brackets, pinions 79 fixed to the shaft and engaging racks 78 on the bearing brackets, and a hand crank 83 by which the shaft is turned to effect the adjustment of the bearing brackets. To maintain the major portion of the lower run of the belt 68 in its adjusted position with relation to the corresponding portion of the upper run of the belt 56, the shaft 81 is held against retrograde movement by a pawl 82 carried by one of the arms 85—85' and engaging a ratchet wheel 82' fixed to the shaft. The bolts 69' of the bearing brackets 69 which are engaged with the sides of the trough 40 and which pass through slots 69" in the bearing brackets 69, are turned back to free these bearing brackets for adjustment.

Screws 72 engaged with the rear sides of the standards 45, and contacting with the corresponding sides of the lower ends of the levers 71 and 71', provide means by which the upper ends of the levers may be rocked rearwardly, whereby to take up any slack occurring in the belt 68. The screws 72 also act through the levers 71 and 71' to maintain the belt 68 under tension.

The driving roller 53 for the belt 56 is driven from the main drive shaft 16 by means including a right angle transmission unit adapted to permit the carrying and separating conveyer to be adjusted into the required inclined position or into the required angular position with relation to the receiving conveyer. This unit includes, as shown in Figures 1, 5 and 9, the horizontal shaft 39 upon which the driving roller 53 is fixed, a vertical shaft 37' journaled in bearings 37ª on the frame extension 12ª, and a bevel gear 37 fixed to the shaft 37' and meshing with a bevel gear 38 fixed to the shaft 39. The gear 37 is driven from the main shaft 16 by means comprising a sprocket chain 32 passing about sprocket wheels 30 and 31 fixed to the shaft 16 and a shaft 31', respectively. The shaft 31' is journaled above a shaft 35 in bearing brackets secured to the frame extensions 11ª and 12ª, and these shafts are connected by spur gears 33 and 34. The shaft 35 has fixed thereto a bevel gear 36 which meshes with the bevel gear 37, as shown in Figure 9. The means connecting the belt 13 to the main drive shaft, and the means connecting the belt 56 to this shaft, have differential driving ratio. The first of these means drives its belt 13 at such speed with relation to the delivery of the lumps of dough from the dividing machine as to effect the depositing of the lumps of dough one in rear of the other upon the belt. The other of these means drives its belt 56 sufficiently faster than the speed of the belt 13 to effect the depositing of the lumps of dough upon the belt 56 in spaced relation.

The belt 68 is driven faster than the belt 56 to effect a further spacing of the lumps of dough on the belt 56 and to effect a preliminary shaping of the lumps of dough before they are delivered to the dough rounder, dough molder or dough proofer. The belt 68 is driven from the shaft 39 by a sprocket chain 39' engaged with a large sprocket wheel 58 fixed to this shaft and a smaller sprocket wheel 60 fixed to a shaft 60' journaled in the levers 71 and 71' below the driving roller 64 for the belt 68. The shaft 60' is connected to the driving roller 64 by meshing spur gears 61 and 62 fixed to the shaft and roller, respectively. The gear 61 is larger than the gear 62.

When the conveyers are right angularly related, as shown by solid lines in Figure 1, the discharge end of the receiving belt 13 extends for a short distance into the entrance opening of the carrying and separating belts 56 and 68 with its discharge end overlying a portion of the receiving end of the belt 56. This arrangement, together with the downwardly and forwardly inclined upper side of the discharge end of the receiving belt 13, insures the positive delivery of the lumps of dough onto the carrying and separating conveyer. The carrying and separating conveyer may be moved into a slightly greater angular position with relation to the receiving conveyer without materially altering this arrangement of the discharge end of the belt 13 with relation to the receiving end of the belt 56. The adjustment of the carrying and separating conveyer into a still greater angular position with relation to the receiving conveyer will, as suggested by broken lines in Figure 1, move the receiving end of the belt 56 beyond the discharge end of the belt 13. To insure the proper delivery of the lumps of dough onto the belt 56 when the carrying and separating conveyer is in this angular position with relation to the receiving conveyer, a shelf 41' is provided to bridge the space between the belts. The shelf 41' is pivotally mounted at one end, as at 41ª, in a recess 41ᵇ in the bottom 41 of the trough 40. The shelf 41' occupies the recess 41ᵇ when the receiving conveyer and the carrying and separating conveyers are right angularly related When the conveyers are arranged in such angular relation as to provide a space between the discharge end of the receiving belt 13 and the receiving end of the belt 56, the shelf 41' extends laterally beyond the belt 56 and below the belt 13, to bridge such space and thus insure the delivery of the lumps of dough from the belt 13 to the belt 56. The pivotal connection of the shelf 41' to the trough 40 permits its ready adjustment into either of these positions.

The standard 45 has the base 46 thereof provided with screws 47 which constitute means by which the standard may be moved into and supported in vertical position on an uneven floor.

From the foregoing description, taken in connection with the accompanying drawings, it will be apparent that the belt 13 conveys the lumps of dough from a dough divider to and between the belts 56 and 68, that the belts 56 and 68 convey the lumps of dough from the belt 13 to a dough rounder, dough molder or dough proofer, and that the belts 56 and 68, owing to their movement in the same direction at different speeds, separate the lumps of dough and subject them to a preliminary working or forming action before delivering them to the rounder or the like. The separation of the lumps of dough by the belts 56 and 68, and their consequent successive delivery from the belts in spaced relation, permits the succeeding operations, to which the lumps of dough are to be subjected, to take place on individual lumps rather than on all of the lumps at the same time.

The angular position of the carrying and separating belts 56 and 68 with respect to the receiving belt 13, enables dough rounders, dough molders or dough proofers, arranged at right angles to the point of deposit of the lumps of dough on the receiving belt by the dough divider, to be fed without the use of an auxiliary separator. As the carrying and separating belts 56 and 68 may be moved into different angular positions with relation to the receiving belt 13, the lumps of dough being delivered by divider No. 1 may be fed to rounder No. 1 or rounder No. 2; or the lumps of dough being delivered by divider No. 2 may be fed to rounder No. 2 or rounder No. 1. This makes the equipment flexible and prevents losses as the result of the breakdown of one of the machines of the equipment. As the major portions of the carrying and separating belts 56 and 68 are arranged in parallel relation and contact with the lumps of dough, the lumps of dough are positively delivered from these belts in any inclined position into which they may be adjusted to serve a dough rounder, dough molder or dough proofer.

If desired, the belt 13 may be arranged with its delivery end above the longitudinal center of the receiving end of the belt 56 when the belts are in right angular relation. In this arrangement the shelf 41' will not be needed, due to the fact that the delivery end of the belt 13 will overlie the edge of the belt 56 when the belt 56 is moved into a greater angular position with relation to the belt 13. In practice the bearing 36ª will be equipped with antifriction balls, a trust bearing will be positioned between the bearing 36ª and the gear 37, and the shafts 37' and 39 will be provided with bores to convey oil from suitable lubricators to the bearings in which these shafts are journaled.

The props 50 comprise lower sections 50ª of channel formation having circular openings 50ᶜ, and upper sections 50ᵇ having elongated openings 50ᵈ, the upper sections being slidably engaged in the lower sections to enable the height of the props to be increased and decreased to vary the inclination of the belts 56 and 68 with relation to the horizontal. The prop sections 50ᵇ are held in adjusted position with relation to the prop sections 50ª by bolts 50ᵇ passing through those openings 50ᶜ and slots 50ᵈ which are in registration when the sections 50ᵇ have been adjusted. The upper ends of the prop sections 50ᵇ are connected by a crossbar 50ᵉ to which the front end of the trough 40 is bolted. The bars 85 and 90 are supported for forward and rearward movement by the crossbar 50ᵉ, as shown in Figure 9.

The pulleys 53 and 64 are grooved to prevent slipping of the belts 56 and 68, whereby to insure the positive separation by the belt 56 of the dough particles or other products delivered to this belt by the belt 13.

The top belt 68 at high speeds or sharp inclinations prevents the dough or other conveyed particles from rolling backward toward the source of supply, the cross feed, belt 13. This arrangement also helps make delivery and separation of the dough pieces quicker and more positive. By the arrangement devised, the possibility of contamination of the dough or other edible products from loose parts emanating from cleats, rivets, fastenings, etc., or any other means used to insure or give a foothold to dough pieces or other particles being carried up the incline is eliminated. All of the work upon the conveyed particles is done by the lower portion of belt 68 and the top portion of belt 56.

What I claim is:

1. An apparatus of the character set forth, comprising an endless receiving belt for lumps of dough, said belt having the front end portion of its upper run inclined downwardly and forwardly from the rear portion of said run, an endless carrying belt for the lumps of dough arranged in horizontal angular relation to said receiving belt with its rear end underlying the front end of said receiving belt, an endless spacing belt for the lumps of dough located above said receiving belt, the opposing runs of said carrying and spacing belts having substantially parallel front portions and widely separated rear portions to receive the discharge end of said receiving belt, and means for driving said belts with the carrying and spacing belts moving in the same direction at different speeds.

2. An apparatus of the character set forth, comprising a receiving conveyer belt for lumps of dough, a carrying and separating conveyer for the lumps of dough including co-operable belts arranged in horizontal angular relation to said receiving conveyer, said co-operable belts having widely spaced entrance portions to receive the discharge end of said receiving belt, and operating means for said conveyers including a transmission unit having an axis about which said carrying and separating conveyer may be adjusted to vary its angular relation to said receiving conveyer.

3. An apparatus of the character set forth, comprising a receiving conveyer for lumps of dough, a carrying and separating conveyer for the lumps of dough including co-operable belts arranged in horizontal angular relation to said receiving conveyer, said co-operable belts having widely spaced entrance portions to receive the discharge end of said receiving belt, and operating means for said conveyers including a transmission unit having axes about which said carrying and separating conveyer may be adjusted to vary its angular relation to said receiving conveyer and to arrange it in a desired upwardly and forwardly inclined position.

4. An apparatus of the character set forth, including a dough-lump carrying and separating conveyer comprising front and rear supports, a roller journaled on the rear support, arms mounted on the front support for forward adjustment with relation thereto, a roller journaled in the arms, an endless belt passing about the rollers, levers pivoted to the rear support and extending above the roller on said support, a roller journaled on the levers above said belt, brackets secured to and extending upwardly from the arms, a roller journaled on the brackets above said belt, an endless belt passing about the rollers on the levers and arms, driving means connected to the rollers on the rear support and levers, and means carried by the rear support for rockably adjusting the levers and securing them in adjusted position.

5. An apparatus of the character set forth, including a dough-lump carrying and separating conveyer comprising front and rear supports, a roller journaled on the rear support, arms mounted on the front support for forward adjustment with relation thereto, a roller journaled in the arms, an endless belt passing about the rollers, levers pivoted to the rear support and extending above the roller on said support, a roller journaled on the upper end of the levers, brackets extending upwardly from the arms and connected thereto for upward and downward adjustment with relation thereto, a roller journaled on the upper ends of the brackets, other brackets supported between the levers and said first brackets for upward and downward adjustment, rollers journaled on the levers and brackets above the lower belt, an upper belt passing about the rollers on the levers and said first brackets and beneath the roller on said second brackets, the roller on the levers being located at a point higher than the rollers on said first and second brackets, and driving means connected to the rollers on the rear support and levers.

6. An apparatus of the character set forth, comprising a receiving conveyer for lumps of dough, said conveyer including rollers and an endless belt passing about the rollers, a main shaft, means establishing a driving connection between said shaft and one of said rollers, a carrying and separating conveyer for the lumps of dough, said second conveyer being angularly related to said first conveyer and including rollers and endless belts passing about said rollers with certain runs thereof in opposed relation, and means establishing a driving connection between said main shaft and certain rollers of the belts of second conveyer, said last means including right angularly related axes about which said second conveyer is adjustable vertically and horizontally with relation to said first conveyer.

7. An apparatus of the character set forth, comprising a receiving conveyer for lumps of dough, a carrying and separating conveyer for the lumps of dough including co-operable endless belts, said second conveyer being angularly related to said first conveyer and adjustable to vary its angular position with relation to said second conveyer, the belts of said second conveyer being widely spaced at one end, the discharge end of said receiving conveyer being arranged to enter within the open space of the separated ends of the second conveyer belts of said second conveyer when the conveyers are in right angular position, said ends being spaced when the conveyers are greater than right angular position, and a shelf carried by one of the conveyers to bridge said space.

8. An apparatus of the character set forth comprising a trough structure, a suitable support therefor, a shaft journalled in the support, upright lever arms fulcrumed on said shaft, belt pulleys journalled on said shaft and on said lever arms, belt pulleys located at the discharge end of the trough, co-operable belts mounted on respective pairs of said pulleys, and an adjusting device for the belt pulley of the lever arms engaging the lower ends of said lever arms.

9. An apparatus of the character set forth comprising a trough structure, a suitable support therefor, a shaft journalled in the support, upright arms mounted on said shaft, a pair of belt pulleys located at the discharge end of the trough, a driving belt pulley journalled on said shaft, a belt pulley located at the upper ends of said arms, co-operable upper and lower belts mounted on respective pairs of said pulleys, and a guide for the upper of said belts mounted on the trough, said guide and the pulley on the arms holding one end of said upper belt in angular and spaced relation to the lower belt whereby to provide an opening to receive material discharged upon the lower belt.

10. An apparatus of the character set forth comprising a trough structure, a suitable support therefor, a shaft journalled in the support, upright lever arms fulcrumed on said shaft, a pair of belt pulleys located at the discharge end of the trough, a driving belt pulley journalled on said shaft, a belt pulley located at the upper ends of said lever arms, co-operable belts mounted on respective pairs of said pulleys, set-screws engaging said lever arms for adjusting tension on the upper belt and a guide for the upper belt mounted on the trough, said guide and the pulley on the arms holding one end of said upper belt in angular and spaced relation to the lower belt whereby to provide an opening to receive material discharged upon the lower belt.

11. An apparatus of the character set forth comprising a trough structure, a suitable support therefor, a pair of belt pulleys located adjacent the receiving end of the trough, devices mounted to have lengthwise and vertical adjustment of the trough located at the discharge end thereof, belt pulleys journalled on said devices, and co-operable belts mounted on respective pairs of said pulleys.

12. An apparatus of the character set forth comprising a trough structure, a suitable support therefor, a pair of belt pulleys located adjacent the receiving end of the trough, devices mounted to have lengthwise and vertical adjustment of the trough located at the discharge end thereof, belt pulleys journalled on said devices, and co-operable belts mounted on respective pairs of said pulleys and devices holding the end of one belt in angular and spaced relation to the adjacent length of the other belt whereby to provide an opening between the belts to receive material discharged upon said adjacent belt length.

13. An apparatus of the character set forth comprising a pair of co-operable and endless belts arranged one above the other and having spaced parallel portions for an appreciable part of their length, the dough engaging part of the lower belt disposed in a substantially horizontal plane, and the dough engaging part of the upper belt having an angularly deflected portion providing an open space with the lower belt whereby to receive lumps of dough from the discharge end of a dough divider, and means for driving the belts in the same direction at different speeds.

14. An apparatus of the character set forth, comprising a trough, means for adjusting and supporting the trough in horizontal and vertical positions, an endless belt having one length thereof overlying the trough, an upper and co-operable belt having the latter portion of its length arranged parallel and close to the trough belt, and the fore part thereof being angularly deflected to provide an open space with the trough belt whereby to receive lumps of dough from the discharge end of a dough divider, and means for driving the belts in the same direction at different speeds.

15. The combination with a dough divider and operative mechanism thereof including a pinion gear, of a dough working and conveying apparatus comprising a suitable support adapted to be moved in a horizontal plane about the axis of said pinion gear, a shaft journalled in the support having gearing connection with the pinion of the dough divider, upright lever arms fulcrummed on said shaft, a trough pivotally mounted on the support, co-operable belts mounted on the trough said support and the lever arms, means for vertically adjusting the trough, and means for angularly adjusting said lever arms.

CHARLES S. BRYKCZYNSKI.
JOHN KOSMAN.